United States Patent [19]

Coviello

[11] 4,282,550
[45] Aug. 4, 1981

[54] DIGITAL MAGNIFICATION SYSTEM
[75] Inventor: John W. Coviello, Baltimore, Md.
[73] Assignee: Westinghouse Electric Corp., Pittsburgh, Pa.
[21] Appl. No.: 97,768
[22] Filed: Nov. 27, 1979
[51] Int. Cl.³ ............................................. H04N 5/22
[52] U.S. Cl. .................................. 358/160; 358/280; 358/287
[58] Field of Search ............... 358/280, 287, 22, 21 R, 358/160, 180, 183

[56] References Cited
U.S. PATENT DOCUMENTS

| 3,272,918 | 9/1966 | Koll et al. | 358/280 |
| 3,541,245 | 11/1970 | Wilby | 358/287 |
| 3,715,498 | 2/1973 | Haynes | 358/280 |
| 3,944,726 | 3/1976 | Ito | 358/280 |
| 4,081,843 | 3/1978 | Okano | 358/280 |
| 4,163,605 | 8/1979 | Yamada | 358/287 |

Primary Examiner—Robert L. Griffin
Assistant Examiner—Michael A. Masinick
Attorney, Agent, or Firm—J. B. Hinson

[57] ABSTRACT

A system for magnifying a selected portion of a digital image as disclosed. The portion of the image to be magnified is selected and then each digital sample comprising the portion to be magnified is repeated in both the horizontal and the vertical direction to expand the selected portion of the image.

6 Claims, 4 Drawing Figures

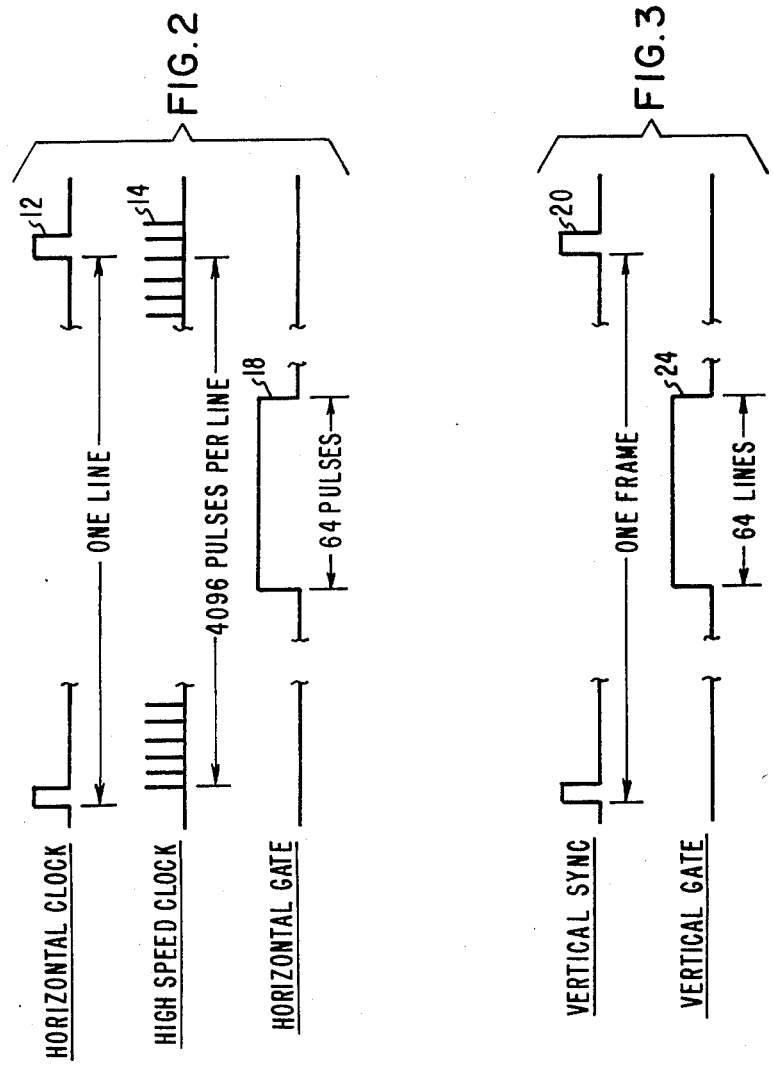

DIGITAL MAGNIFICATION SYSTEM

BACKGROUND OF THE INVENTION

1. Field of the Invention

The invention relates to scanning systems and more specifically to a system for digitally magnifying a selected portion of a scanned image.

2. Description of the Prior Art

Typically in the prior art, portions of scanned images have been magnified using optical techniques. This technique almost always resulted in the loss of resolution because of imperfections in the optics. Digital computers and appropriate software have also been used to magnify scanned images. The disclosed system overcomes these shortcomings by providing a system for magnifying selected portions of an image without any loss in resolution.

SUMMARY OF THE INVENTION

The scanned image is provided by a conventional scanner. In addition to the video signal horizontal and vertical synchronizing signals are also provided by the scanner. The horizontal synchronizing signal and a clock signal, which is synchronized with the digital data from the scanner, are coupled to the inputs of a delay circuit to generate a gate which determines the portion of the lines of the image to be magnified. Similarly, the vertical synchronizing signal is coupled to a vertical delay to determine which lines the portion of the image to be magnified correspond to. The video corresponding to the portion defined by the vertical and horizontal gates is stored in a digital memory. During the next frame of the video signal the information stored in the data memory is read out and repeated in both the horizontal and vertical direction to produce a magnified image having the same relative dimensions as the original image.

BRIEF DESCRIPTION OF THE DRAWINGS

FIGS. 2 and 3 are timing signal diagrams associated with the circuit.

DESCRIPTION OF THE PREFERRED EMBODIMENT

Figure 1:
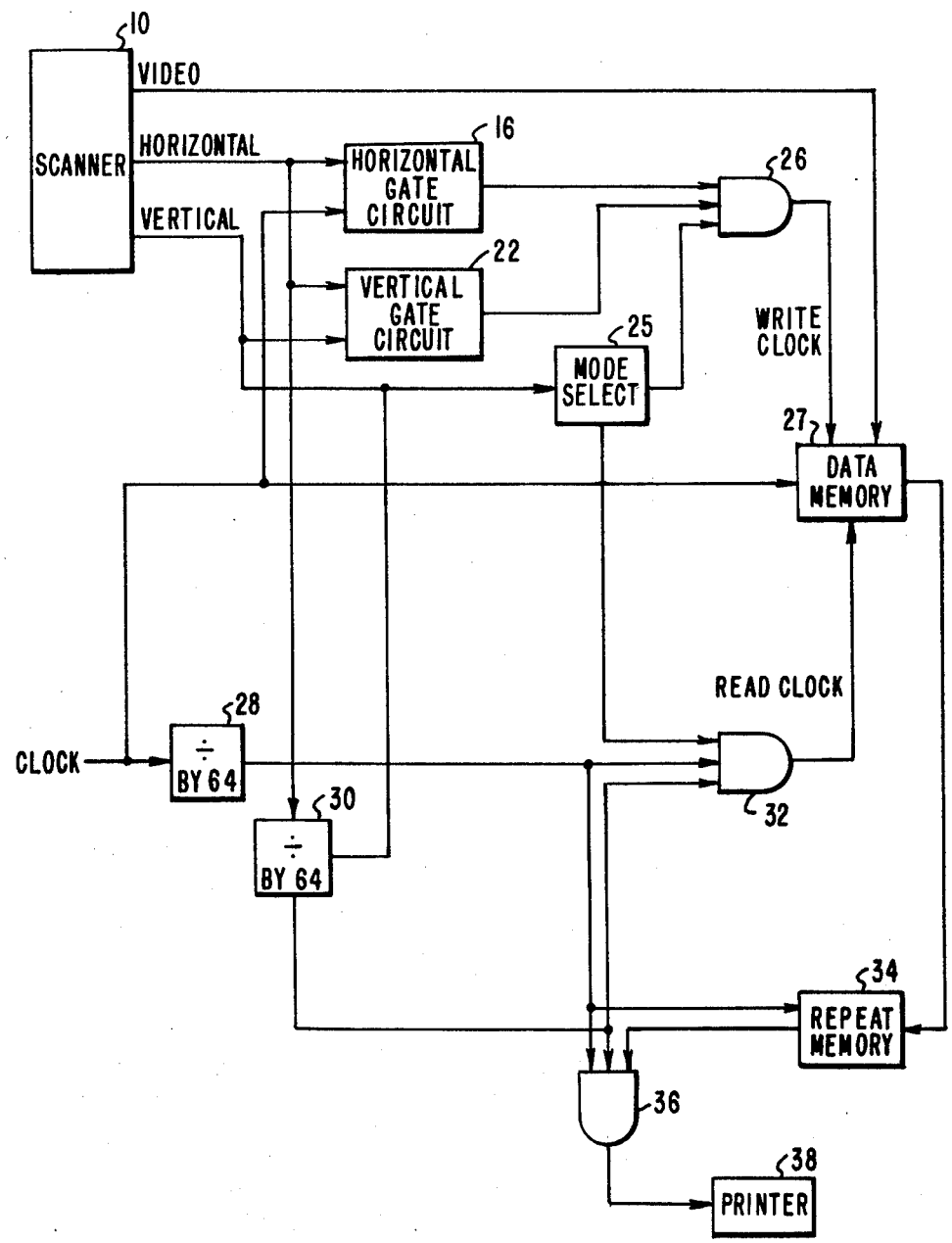
FIG. 1 is a functional block diagram of the preferred embodiment of the invention.

FIG. 1 is a functional block diagram of the preferred embodiment of the invention. A scanner 10 produces a digital video signal and horizontal and vertical synchronizing signals. In the preferred embodiment of the invention, the scanner 10 is a laser scanner having a resolution of approximately 5000 lines. Suitable scanners are commercially available. Alternatively, the scanner may be assembled using commercially available components.

Each line of the video signal is digitized and processed to produce a single bit signal having a logic one if the analog video signal is above a predetermined value and a logic zero if the signal is below a predetermined value. The scanner 10 also provides a clock signal synchronized with the video data. The horizontal sync pulses, two of which are identified at reference numeral 12 in FIG. 2 and a high frequency clock signal 14, FIG. 2, are coupled as inputs signals to a horizontal gate circuit 16 to produce a horizontal gate signal 18. The frequency of the high frequency clock signal 14 is selected such that for each line of the video there are 4,096 pulses. These pulses are also synchronized with the horizontal sync signal 12. The horizontal gate signal 18 is also synchronized with the high frequency clock signal 14 and has a duration sufficient to define an interval equal to 64 pulses of the high frequency clock signal 14.

The horizontal sync signal 12 and the vertical sync signal 20 of FIG. 3 are coupled as input signals to a vertical gate circuit 22. The output of the vertical gate circuit 22 is a vertical gate signal 24 which is synchronized with the vertical sync pulses and has a duration of 64 lines of the video. Additionally, the vertical sync signal 20 is coupled as an input to a mode select circuit 26 to produce store and print signals on alternate frames of the video signal.

Assuming that the mode select circuit 25 is in the input (store) mode, a write signal is coupled to one input of a gate circuit 26. The other two inputs to the gate circuit 26 are the horizontal and vertical gate signals from the horizontal gate circuit 16 and the vertical gate circuit 22. When all of these signals are logic one, the output of the gate circuit 26 goes to a logic one signal coupling a write signal to the data memory 28. The second input to the data memory 28 is the video signals from the scanner 10 previously described. Whenever both the horizontal and vertical gate signals are logic one the digital video signal is stored in the data memory 28. This will result in all digital video signals corresponding to a portion of the scanned image which is equal to 64 adjacent samples of 64 adjacent lines of the scanned image being stored in the data memory 28. This data also corresponds to the portion of the image to be magnified.

The next pulse of the vertical sync signal sets the mode select circuit 25 to the print (output) mode. The pulses of the high speed clock signal 16 are coupled to the input of a first divide circuit 28 to produce a clock signal having a frequency of 1/64th of the storage rate. Additionally, the horizontal and vertical sync pulses are coupled as inputs to a second divide circuit 30 to produce at the output of this circuit a gate signal defining each 64th line of the scanner 10. The outputs of the first and second divide circuits, 28 and 30, and the read signal from the mode select circuit 25 are coupled as inputs to a read enable gate 32. The output of the read enable gate 32 is coupled as an input to the data memory 28 to cause 64 samples of data to be read on every 64th line of the line of the scanner 10. The data from the data memory 10 is coupled as an input signal to a repeat memory 34. The 64 samples correspond to a single line segment of the portion of the scanned image to be magnified. These samples are stored in the repeat memory 34 and then repeated for 64 lines at the rate of the read clock signal from the first divide circuit 28 to produce a magnified image data signal at the output of the repeat memory 34. The magnified portion of the image will have essentially the same size as the original image. That is each line will contain 4,096 samples and each frame will contain 4,096 lines.

The outputs of the first and second divide circuits 28 and 30 along with the data signal from the repeat memory 34 are coupled as inputs to a data gate 36 to produce a signal which drives a printer 38. The signals from the divide circuits provide thin horizontal and vertical lines which identify the boundaries of the original cells of the sample. Since the digital video signal stored in the data memory 28 is a two level signal corresponding to black and white in the resulting video image as previously described, the image on the printer 38 will similarly be in all black or white. Obviously, if it is desirable to magnify a video signal having more resolution in the gray scale, each of the samples of the video signal could be stored as a multibit digital signal by suitably expanding the data memory 28 and the repeat memory 34 as well as the data gate 36.

Figure 4:
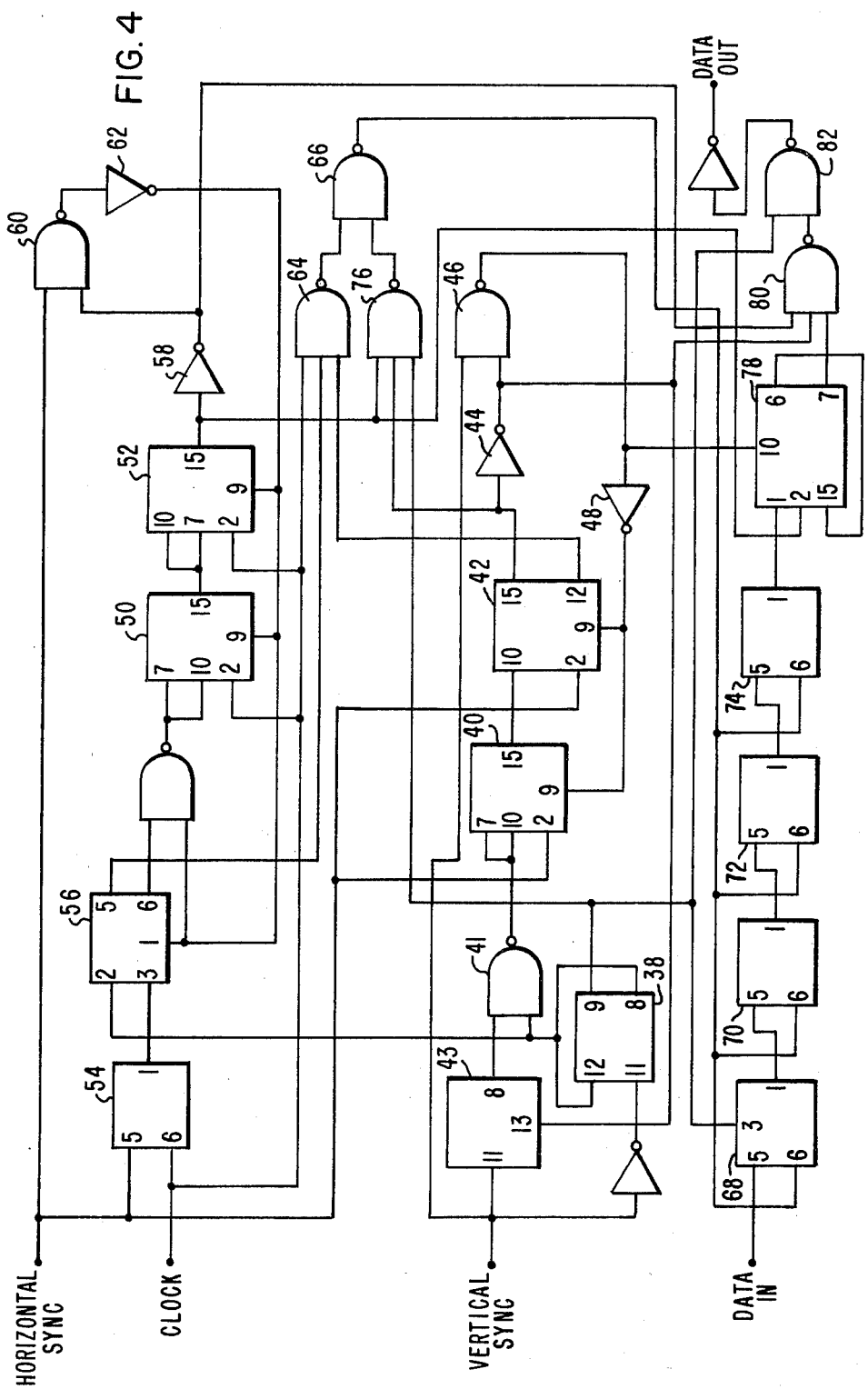
FIG. 4 is a detailed logic block diagram of the circuitry used to magnify the selected portion of the scanned image.

FIG. 4 is a detailed block diagram of the digital circuitry for magnifying the selected portion of the image. As described above, the circuit operates in either the input or the output modes. The circuit can be implemented using standard commercially available general purpose integrated circuits.

The vertical sync pulse from the scanner is used to control the input/output mode flip-flop 38. For purposes of describing the input mode, it is assumed that mode flip-flop 38 is set to the input mode. The vertical size, in terms of number of scan lines, of the portion of the image to be magnified is determined by two counters, 40 and 42. In the particular embodiment of the invention, the counters 40 and 42 were preset to a count of 176 before the start of the input cycle and are enabled by the output of a flip-flop 43 which is set by the vertical sync pulse. The horizontal synchronizing pulses are counted by counters 40 and 42 until the counter reaches a count of 255 at which time the carry output of the counter 42 as inverter by an inverter 44 resets the scan flip-flop 43 to prevent further counting. On the next vertical sync pulse, the output of a NAND gate 46, inverted by an inverter 48, presets the counters 40 and 42 to 176. The counter 42 has an output signal from an intermediate stage which will be low for the first 16 scan lines of the scan and high for the next 64 lines when the counter is preset, as described above. This signal is used as the vertical gate signal.

The horizontal gate is generated by two counters 50 and 52. The horizontal sync signal and the high frequency clock signals are coupled as input signals to a 1,024 bit shift register delay circuit 54. This delays the horizontal synchronizing pulse 1,024 counts of the high frequency clock signal. This assures that the sample to be magnified is not taken at the beginning of each scan line because these portions of scanned images may contain distortions due to non-linear portions of the deflection signals. At the expiration of this delay, the output signal of the shift register 54 sets a horizontal enable flip-flop 56 which enables counters 50 and 52 which have been preset to a count of 191. The pulses of the high frequency clock signal are then used to step the counters 50 and 52 until the counters reach a count of 255 at which time the carry output of the second counter provides a signal defining an interval equal to 64 pulses of the high frequency clock signal. When the counter 52 reaches its maximum value, the output signal is inverted by an inverter 58 and coupled to the input of a gate 60. Gate 60 is enabled at this time and its output is inverted by an inverter 62 to reset the horizontal enable flip-flop 56 and prevent further counting. The output signal of flip-flop 56 is the horizontal gate signal. The output of inverter 62 is also applied to counters 50 and 52 causing them to preset to a count of 191 on the next high frequency clock pulse. The pulses of the high frequency clock, the output signal of the horizontal scan enable flip-flop 56, and the vertical gate from counter 42 are coupled as input signals to a gate 64 to generate at the output of this gate a signal consisting of bursts of 64 pulses of the high frequency clock signal. These bursts occur whenever the horizontal and vertical gates overlap in time. These bursts of pulses are coupled through a NOR gate 66 to the clock line of a 4,096 bit shift register memory comprising four modules, 68 through 74. The data from the scanner is also coupled to the input of this memory. This causes the data corresponding to the portion of the image to be magnified to be shifted into the shift register memory modules 68 through 74 during the scan cycle of the system.

On the next vertical sync pulse, the status of the mode flip-flop 38 will change, shifting the circuit to the print (output) mode. In the print mode, counters 50 and 52 as well as 40 and 42 are set to the divide-by-64 mode. Since the counters 50 and 52 are counting the high frequency clock pulses, this generates at the output of counter 52 a clock signal which is equal to 1/64th of the high frequency clock signal. Counting during the horizontal retrace time is prevented by the horizontal sync signal, applied through gate 60 and inverter 62 to keep counters 50 and 52 at their preset values. Counters 40 and 42 count each horizontal sync pulse and generate an output signal during each 64th line of the image. On the 64th line, the output signal of counter module 52 along with the output signal of counters 40 and 42 are combined in a gate 76 with the output of mode flip-flop 38 to generate a clock signal to the memory modules 68 through 70 to shift 64 of the data samples (one line of the original sample) into the recirculating memory module 78. For the next subsequent 64 lines of the display, the 64 samples stored in the recirculating memory 78 are printed out and recirculated at 1/64th of the rate of the high frequency clock signal causing the line to be repeated 64 times. On the 64th line, another 64 samples from the memory modules 68 through 74 are shifted into the recirculating memory 78 and these samples are recirculated and printed for the next 64 lines. This process is completed until all the information stored in the recirculating memories 68 through 74 is displayed.

The data output from the recirculating memory 78 along with the inverted horizontal and vertical one of 64 signals are combined in a NOR gate 80. This prints a reference grid in the magnified image. The grid identifies the limits of each digitized cell of the original sample. This grid is useful to help correlate a point in the magnified image to the same point in the original image. This function and gate 80 could be deleted if the grid is not desired.

During the input mode, the output signal of mode flip-flop 38 disables gate 82 to assure that the output data signal is always a logic zero. Also during the input mode, gate 76 which provides the output data clock is disabled by flip-flop 38. During the output mode the output of flip-flop 38 disables the action of sample gate flip-flop 56 and is applied through gate 41 to allow counters 40, 42, 50 and 52 to count for the entire output scan.

Different shades of gray can be printed by expending the data memories 68 through 74, the repeat memory 78 and output gates 80 and 82 for each bit of a multibit data sample.

I claim:

1. A digital magnification system for a scanned image, comprising in combination:
   (a) first counter means responsive to a horizontal synchronizing signal and a high speed clock signal to generate a first time gate defining the horizontal portion of each line of said scanned image;

(b) second counter means responsive to synchronizing signals to generate a second time gate defining a selected number of scan lines of said scanned image;

(c) memory means for receiving and storing data samples in response to said first and second time gates said data samples corresponding to a selected portion of said scanned image; and (d) circuit means for controlling said memory means to repeatedly read said stored data samples to produce a magnified image of a selected portion of said scanned image.

2. A system in accordance with claim 1 further including delay means to initiate said first counter means a predetermined time interval following each pulse of the horizontal synchronizing signal.

3. A system in accordance with claim 1 further including delay means for initiating said second time gate a predetermined number of lines of said scanned image after said vertical synchronizing pulse.

4. A system in accordance with claim 1 wherein said memory means has sufficient storage space for storing 64 samples of 64 lines of said scanned image.

5. A system in accordance with claim 1 wherein said circuit means includes a recirculating shift register for repeating data samples stored therein a predetermined number of times.

6. A system in accordance with claim 5 wherein the data stored in said recirculating shift register is repeated 64 times.

* * * * *